Dec. 25, 1962 H. E. METCALF 3,070,530
NEUTRONIC REACTOR POWER PLANT
Filed July 23, 1946 3 Sheets-Sheet 3

Witness:
Walter L. Schlegel, Jr.

Inventor:
Herbert E. Metcalf
By Robert A. Lacombe
Attorney

United States Patent Office 3,070,530
Patented Dec. 25, 1962

3,070,530
NEUTRONIC REACTOR POWER PLANT
Herbert E. Metcalf, Los Angeles County, Calif., assignor to the United States of America as represented by the United States Atomic Energy Commission
Filed July 23, 1946, Ser. No. 685,757
3 Claims. (Cl. 204—193.2)

My invention relates to atomic power plants and more particularly to an atomic power plant in the form of a gas turbine wherein the circulating gaseous medium is heated by a mass of chain reacting material known as a neutronic reactor or "pile."

The general principles and mode of operation of neutronic reactors have been fully set forth in the Fermi and Szilard application, Serial No. 568,904, filed December 19, 1944, now Patent No. 2,708,656, issued May 17, 1955.

An object of the present invention is to provide a means and method of operating a gas turbine by heat energy developed by nuclear fission in a controllable chain fission reaction.

Another object of the invention is to operate a gas turbine by means of heat energy generated in a neutronic reactor or "pile" without substantial contamination of the operating portions of the turbine with the radioactive products of fission.

Still another object of my invention is to provide a gas turbine operated by heat generated in a neutronic reactor with a minimum length of gas path and with maximum shilding of the turbine from the radiations generated during operation of the reactor.

It has been previously suggested that a neutronic reactor could be used to heat gas for use in a gas turbine. No attempt, however, has hithertofore been made as far as is known to combine a neutronic reactor with a gas turbine structure in such a manner that the gas paths are sufficiently short to afford what is a substantially unitary structure. Such an arrangement, as will be described and claimed herein, involves many problems in order that the turbine mechanism be so shielded from radiactivity as to ensure proper operation of this mechanism at all times. Furthermore, neutronic reactors during their operation generate in addition to heat large quantities of radioactive fission products some of which tend to poison the reactor and reduce its ability to maintain a chain reaction, as more fully discussed in the Fermi and Szilard application. These fission products, if allowed to pass through the turbine will not only contaminate the turbine to such an extent that it cannot be serviced during operation, but also will render the turbine structure radioactive for a long time after shutdown depending upon the average half lives of the radioactive fission products deposited therein. The present structure disclosed and claimed herein prevents fission products from entering through the reactor, and at the same time makes provision for sweeping out undesired fission products from the reactor during operation and at the same time salvages for use in the turbine a greater part of the heat picked up during the sweeping out process.

The above and other advantages and objects of the present invention will be more fully understood by direct reference to the drawings attached hereto in which.

Figure 1:
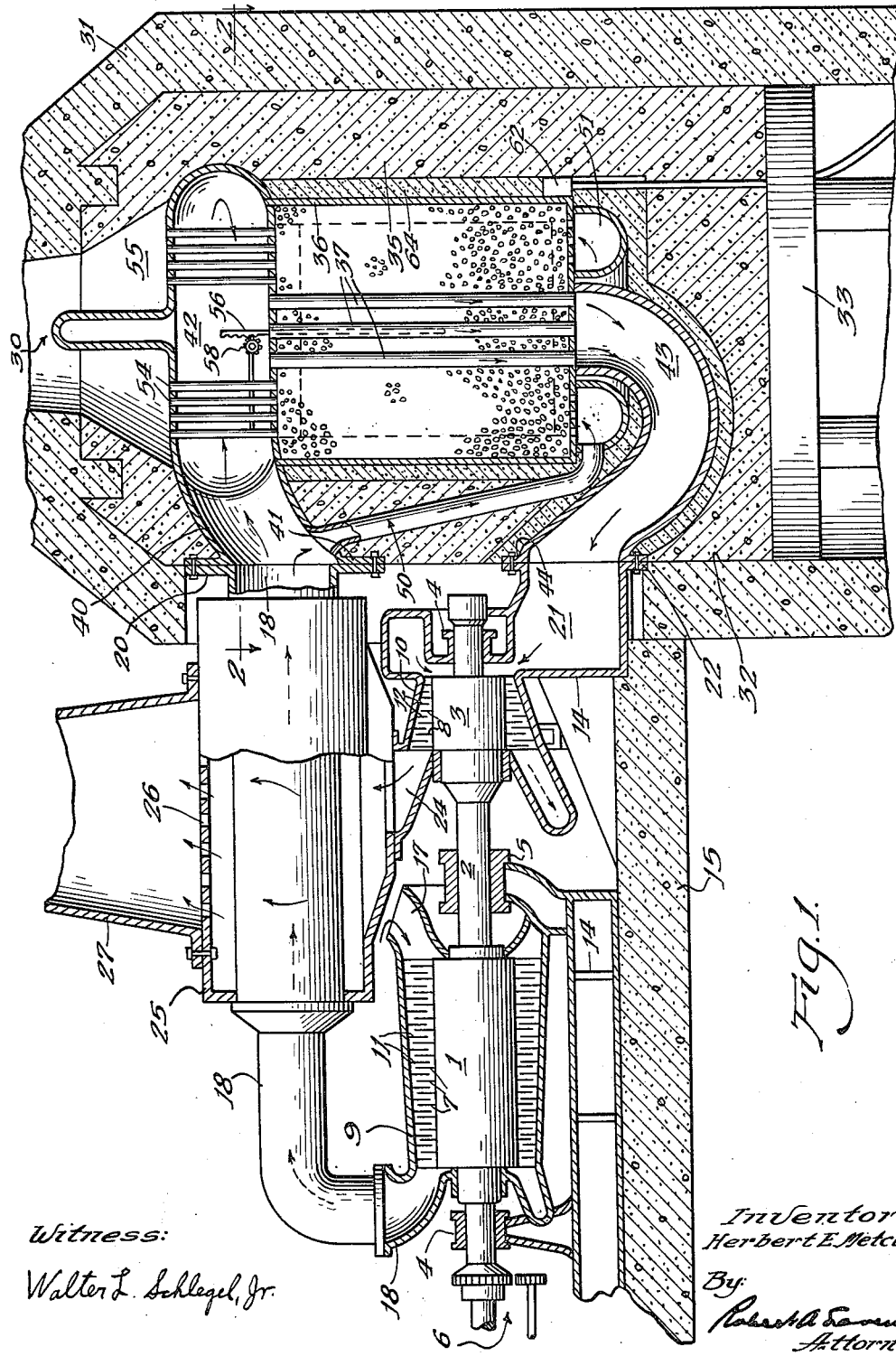
FIG. 1 is a diagrammatic longitudinal vertical sectional view of a gas turbine structure and a chain reacting pile or neutronic reactor operatively attached thereto.
Figure 2:
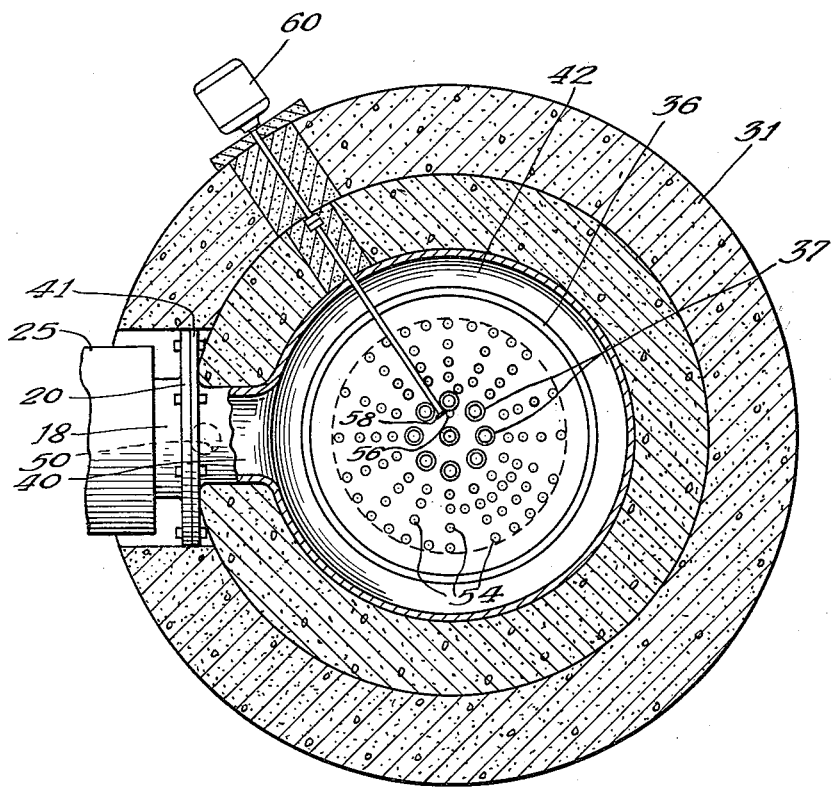
FIG. 2 is a cross sectional view taken as indicated of the reactor by the line 2—2 of FIG. 1.

While there are many types of neutronic reactors that can be used to generate heat for use in heating gases in gas turbines, I prefer to illustrate by invention as utilizing a neutronic reactor of the enriched pebble type generally described in and claimed in the Daniels application, Serial No. 621,845, filed October 11, 1945, now Patent No. 2,809,931 issued October 15, 1957. Furthermore, as there are many types of gas turbines well known in the art, I prefer to illustrate my invention as applied, for example, to a locomotive turbine, such as designed and known as the Brown-Boveri type. Such a combination has been illustrated in FIGS. 1 and 2. Referring particularly to FIG. 1, the gas turbine proper comprises an axial flow compressor rotor 1 mounted on a shaft 2 along with a turbine rotor 3, shaft 2 being supported on end bearings 4 and center bearing 5. A conventional starter 6 is connected to the shaft 2 to impart initial rotary motion thereto. The compressor and turbine rotors are provided with the customary turbine plates or blades 7 and 8, respectively, and are surrounded by external casings 9 and 10, respectively, supporting stationary plates or blades 11 and 12. Bearings 4 and 5 are supported on a foundation 14 joining the casings and resting on a firm concrete base 15. As the type of turbine shown in FIGS. 1 and 2 uses atmospheric air as the circulating fluid, the flow channels will next be described.

Air is taken from the atmosphere flow compressor inlet 17, passes through the compressor plates and enters an exhaust or outlet conduit 18 under pressure. This conduit 18 travels horizontally over the top of the turbine structure to enter a neutronic reactor, later to be described, said conduit 18 terminating in an annular flange 20 disposed slightly beyond the end of shaft 2 and its associated end bearing 4.

The turbine inlet 21 is also provided with an annular flange 22 coplanar with flange 20 and is adapted to receive heated gas from outlet 43 connected to the neutronic reactor. The heated air passes from inlet 21 through the turbine plates into turbine outlet 24 and through a heat exchange casing 25 surrounding a portion of gas outlet conduit 18 closely adjacent flange 20. The turbine outlet gas passes around conduit 18 through openings 26 in casing 25 and into stack 27.

This completes the description of the turbine structure which is standard except for the use of stack 27. The structure described is intended to be illustrative only, and any type of gas turbine having a connected compressor and turbine will serve, provided suitable couplings are provided to connect the neutronic reactor with the conduit between the outlet of the compressor and the inlet of the turbine.

Referring again to FIGS. 1 and 2, a preferred type of neutronic reactor is connected in such a manner as to heat the compressed air coming from the compressor and to deliver the air heated to a high temperature to the turbine, together with structure preventing fission products from entering this air stream.

A stack 30 is provided and is supported by an outside shield 31. This shield defines a cylindrical internal space 32 in which an elevator 33 operates. The neutronic reactor structure is supported on this elevator and comprises an outer shield 35 which may be of any suitable material having for its main purpose the reduction of leakage of neutrons and gamma rays. The shields may be, for example, of concrete including high density components, the water in the concrete acting to absorb escaping neutrons and the high density materials acting to absorb gamma radiation. If desired, shield 35 may be, for example, of alternating layers of hydrogenous material such as Masonite and iron.

The shield 35 surrounds a cylindrical casing or tank 36, which may be of any suitable material, such as iron or steel, and the casing 36 contains the mass of neutronically reactive material which in the example shown comprises comingled pebbles of compacted precipitated oxides of $U^{235}$, a material fissionable by slow neutrons, and pebbles of beryllium oxide, an efficient neutron energy moderator used to reduce the high energy neutrons emitted at fissioning to slow or thermal energies in order that the chain reaction may be maintained. Such pebbles are capable of being operated up to 2,000° C., the heat being generated by the heat of the fissions at the power level desired. A sufficient mass of pebbles is provided so that the mass is over critical size, i.e., a size at which the neutron reproduction ratio within the mass can be regulated to a value at least slightly greater than unity.

Extending through one side of the shield 35 is a reactor inlet 40 having an annular inlet flange 41 at the edge of the shield 35 mating with flange 20 on conduit 18. Reactor inlet 40 communicates with a cylindrical chamber 42 positioned above reactor casing 36. The chamber 42 at the center thereof is connected with a plurality of high temperature tubes 37 made, for example, of "Chromel" or other high temperature materials or alloys. These tubes pass through the central portion of the reactor and extend through the bottom wall of casing 36. The lower extremities of tubes 37 communicate with the reactor outlet conduit 43 which turns upwardly to terminate in flange 44 connected with flange 22 on the inlet 21 to the turbine. Thus, there is a path for air from the compressor through the central portion of the reactor and back into the turbine, all parts in the vicinity of the reactor being shielded. Furthermore, the tubes 37 are impervious to the fission fragments emitted at the time of fission so that no fission fragments can enter the gas stream. Thus the only significant radioactivity present in the air after having passed through the tubes 37 is argon 41, an isotope produced by nuclear reaction of the argon component of the air under intense neutron bombardment. Inasmuch as argon 41 has a relatively short half life of the order of 110 minutes, any radioactivity induced in the turbine blades quickly diminishes after the device has been shut down several days.

Inasmuch as "Chromel" and various steel alloys that would normally be used for tubes 37 are good absorbers of both neutrons and gamma radiations, to the extent that these tubes do absorb neutrons and gamma radiations they are heated so that in addition to the heat transmitted to these tubes by the heated pebbles they will be heated by their radiation absorption and will thus tend to become hotter than the remainder of the reactor. Such tubes, however, are not fully opaque to either neutrons or gamma radiations as heretofore discussed.

It will be noted that relatively few central tubes 37 are utilized. This is because such tubes are neutron absorbent, thus reducing the efficiency of the reactor by the amount of absorption and thereby increasing the critical size of the reactor. It will be understood that the reactor would have to be exceptionally large and would utilize a relatively great amount of $U^{235}$ if a large number of such neutron absorbing tubes are utilized in the reactor.

The center of the reactor is always the hottest portion unless the central portion of the reactor is provided with means to flatten the neutron density curve across the reactor as set forth in copending application Serial No. 552,730, filed September 5, 1944 now Patent No. 2,774,730, issued December 18, 1956. In the present instance, the use of a few central tubes provide many advantages with few disadvantages. First, the central tubes will absorb some neutrons and, therefore, will require some additional size or mass of $U^{235}$. By the amount of their absorption, however, they are heated to a temperature higher than the remainder of the pile, and by their position in the pile they reduce the neutron density in the center of the pile thus flattening the reactivity curve of the pile and equalizing the neutron density therein, thereby tending to produce a more uniform temperature in the pile than would normally be present. It can, therefore, be seen that inasmuch as tubes 37 pass through the hottest portion of the pile they are somewhat hotter than the remainder of the pile and carry the air that is to be heated and used in the gas turbine. Some of the air, however, compressed in the compressor is used to cool the reactor. This portion of the air is conveyed through a by-pass 50 from reactor inlet 40 and passes downwardly through shield 30 to enter an annular chamber 51 connected with casing 36 around the high temperature outlet 43. From chamber 51 the air passes upwardly through the pebbles to emerge at the top of the reactor in a plurality of heat exchange tubes 54 passing upwardly through reactor inlet chamber 42 to form an annular bank of heat exchange tubes surrounding the inlets to high temperature tubes 37. Thus the heat absorbed within the reactor by the by-passed air is used to preheat the reactor inlet air before it reaches high temperature tubes 37. However, during its passage through the reactor the by-passed air becomes extremely radioactive due to the entrainment therein of fission products, both solid and gaseous. This highly contaminated air is separated from the turbine air by tubes 54, and the bulk of the heat of the reactor is transferred to the turbine air by tubes 54. Thereafter the major portion of the compressor output is raised in temperature or, in other words, is superheated by passing through the central tubes 37.

The highly contaminated air after passing through tubes 54 passes into an exhaust chamber 55 in the shield 35 above inlet chamber 42 and thence into stack 30 to be exhausted into the upper air. If desired, the solid fission products may be separated from the stack gases in any convenient manner as, for example, by electrostatic precipitation. Thus the fission products are removed to a large extent from the reactor, the heat absorbed during this removal is to a large extent salvaged, and the fission products are prevented from entering the turbine. Furthermore, neutron absorbent gaseous fission products are prevented from accumulating within the reactor.

Neutron density within the reactor is regulated by a control rod 56 of neutron absorbent material, such as cadmium, said rod being operated by a rack and pinion mechanism 58 operatively connected to a motor 60 (FIG. 2) disposed externally of shield 31. The rod 56 is movable inwardly and outwardly of the reactor to vary the neutron reproduction ratio thereof, as more fully discussed in the above-mentioned Fermi and Szilard application. The neutron density is monitored by an ionization chamber 62 connected to any conventional monitoring device (not shown), said chamber 62 being preferably located within a neutron reflector 64 of any suitable material such as graphite or beryllium adapted to reduce neutron losses from the periphery of the neutronic reactor by reflecting escaping neutrons back into the reactive mass within the casing 36.

An operative reactor of the above-described type having a height of 120 centimeters and a diameter of 130 centimeters and having a volume of approximately 1600 liters may be constructed of thoroughly mixed pebbles or lumps of $UO_2$ and BeO having a density of approximately 9 gms./cm.$^3$ and 2½ gms./cm.$^3$, respectively. The pebbles may be of any convenient size such as, for example, approximately 2 inches in diameter. The $UO_2$ pebbles contain approximately 88.02 percent $U^{235}$ and are mixed with the BeO pebbles in such proportion that the $U^{235}$ constitutes approximately 1.8 percent of the reactive mass, which has a neutron reproduction ratio greater than unity, and is thus capable of sustaining a nuclear fission chain reaction. In such a construction approximately 63 kilograms of uranium and approximately 3500 kilograms of BeO are required. The pipes 37, in such an arrangement, may be formed of iron or steel and may have an inner diameter of approximately 5 centimeters and a wall thickness of approximately 3 millimeters.

Figure 3:
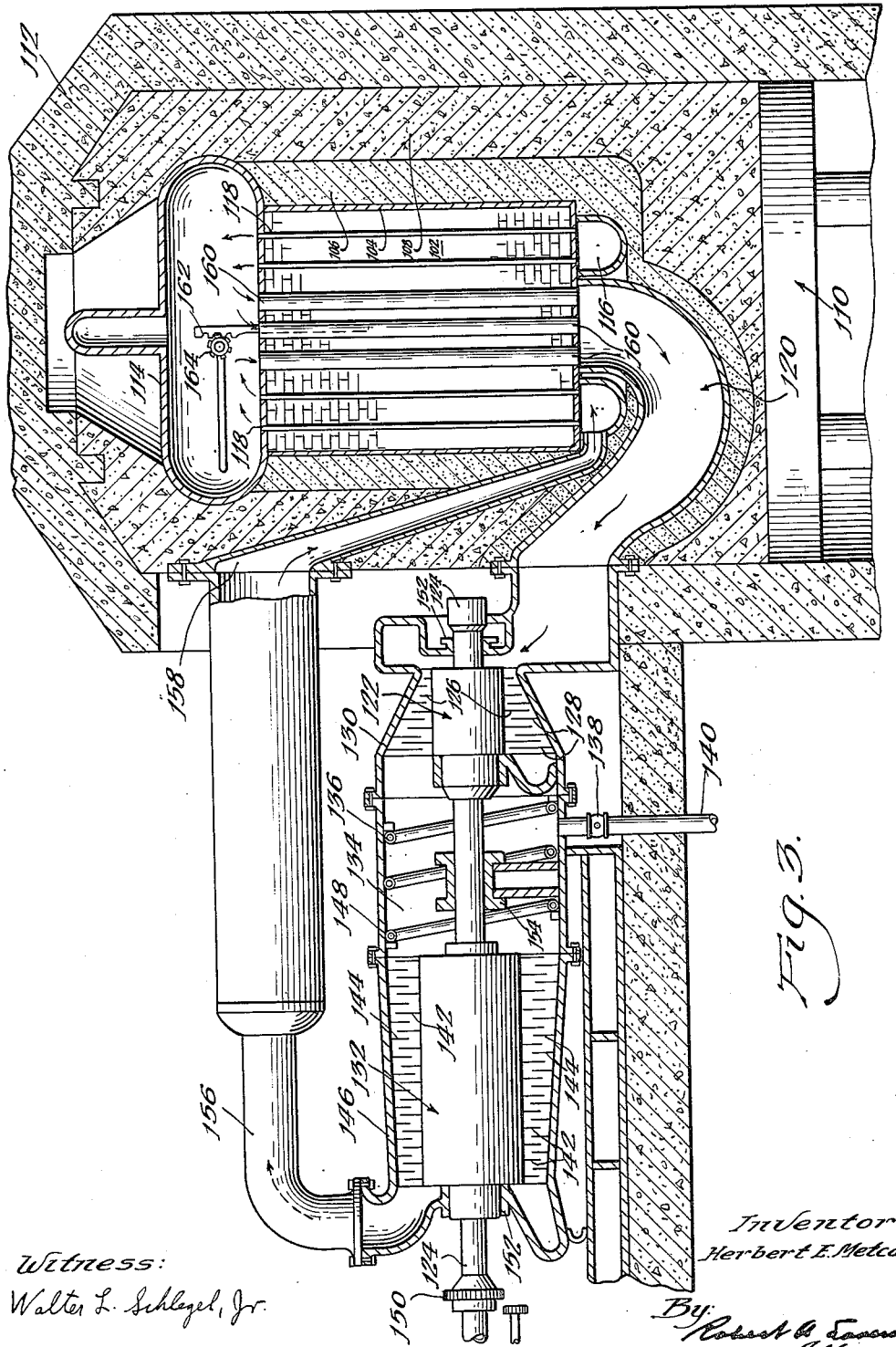
FIG. 3 is a diagrammatic sectional view corresponding to FIG. 1 but illustrating a modification of the invention.

Referring now to FIG. 3, a modification of the invention is illustrated wherein a neutronic reactor is operatively connected to a compressor and turbine device by means of a closed helium circulatory system. The reactor generally designated 102 is of a construction more fully described in a copending application, Serial No. 684,117, filed July 17, 1946 now Patent No. 2,826,495, issued March 11, 1958 and is in the form of a pile or mass of beryllium-uranium alloy blocks. The reactor 102 is contained within a pressure tank or casing 104, which is substantially surrounded by a neutron reflector 106 of any suitable neutron reflecting material such as, for example, beryllium or graphite. The tank 104 and the reflector 106 are disposed within a biological shield 108, which is supported on an elevator 110, as in the previously described embodiment, said elevator being operable to raise the reactor 102 and associated structure into the position illustrated within the outer biological shield 112. A helium tank or chamber 114 is disposed at the top of the tank 104 and an annular helium inlet tank or chamber 116 is disposed at the bottom of the tank 104, said tanks 114 and 116 being interconnected by vertical conduits 118 formed of any suitable material such as, for example, stainless steel. The tank 114 is also connected by conduits 160 to a helium outlet 120 which communicates with the inlet side of a conventional gas turbine generally designated 122 comprising a rotatable shaft 124 with rotor plates 126 mounted thereon and alternately arranged with stationary plates 128 formed within a casing or housing 130. The outlet side of the turbine 122 is connected to a conventional compressor generally designated 132 by a chamber 134 having a coil 136 therein for the purpose of cooling the helium passing from the turbine 122. The chamber 134 is connected through a conventional shut-off valve 138 to a helium inlet line 140 adapted to convey a supply of helium to the system.

The compressor 132 comprises a plurality of rotatable plates 142 alternately arranged with stationary plates 144 mounted within a casing or housing 146, which is connected to the before-mentioned casing 130 by a casing 148 defining the before-mentioned chamber 134, said casing 148 being removably connected as by bolts to the casings 130 and 146.

The shaft 124 is connected to a conventional starter mechanism 150 adapted to impart initial rotary motion to the shaft, and the shaft is supported by end bearings 152 and an intermediate bearing 154 as in the previously described embodiment.

The outlet side of the compressor 132 is connected by an outlet conduit 156 to an inlet conduit 158 connected to the inlet chamber 116. Thus, the compressed helium flows upwardly through the tubes 118 into the chamber 114 and downwardly through the neutron absorbent tubes 160 into the helium outlet 120, which as above noted is connected to the inlet side of the turbine 122, thereby affording a closed helium circuit. It may be noted that tubes 160 are preferably of "Chromel" or tungsten steel having a relatively high neutron capture cross section in order to equalize the neutron density within the reactor 102 by flattening the activity curve thereacross, as described in connection with the embodiment of FIGS. 1 and 2.

The neutron density within the reactor 102, as in the previously described embodiment, is regulated by one or more control rods 162 of highly neutron absorbent material such as, for example, cadmium, said rod being actuated by a rack and pinion mechanism 164. The neutron density may be monitored by any conventional means, not shown.

It will be understood that the embodiment shown in FIG. 3 is particularly advantageous in eliminating contamination of the turbine and compressor structure by radioactive materials. In this connection, it may be noted that the helium is at all times spaced from the fissionable material within the reactor 102 by the tubes or conduits 118 and 160, thereby preventing contamination of the helium with fission products of the reaction. Furthermore, the helium has a negligible neutron capture cross section so that substantially no radioactive isotopes thereof are formed as a result of nuclear reaction under neutron bombardment. It will thus be understood that the system shown in FIG. 3 may be readily disassembled without danger to operating personnel and without the necessity of shutting the system down for several days prior to disassembly thereof. This facilitates maintenance and repair of the power plant.

It will be understood that the above-described embodiments of the invention are merely illustrative, and many modifications thereof will be readily apparent to those skilled in the art without departing from the spirit of the invention or the scope of the appended claims.

While the above-described theories of nuclear reaction are based on the best presently known experimental evidence, the invention is not limited thereto inasmuch as additional experimental data later discovered may modify said theories.

What is claimed is:

1. A neutronic reactor power plant comprising a gas turbine, a compressor driven by the turbine, and a neutronic reactor comprising a reactor vessel containing a reactive comprising commingled pebbles of a material fissionable by neutrons of thermal energy and pebbles of a moderating material, a plurality of tubes disposed vertically in the central portion of said vessel, an inlet chamber located above the vessel, said inlet chamber communicating with said tubes, an inlet conduit connecting said compressor with said inlet chamber, an outlet conduit connecting the lower end of said tubes with said gas turbine, whereby gas is compressed in the compressor, heated in the tubes in the reactor vessel, and then passed to the turbine without picking up fission fragments in the reactor vessel, an annular chamber surrounding said outlet conduit below said vessel and in communication with the interior thereof, a by-pass conduit connecting said inlet chamber and said annular chamber, and a plurality of tubes forming a heat exchanger in said inlet chamber in communication with the interior of said vessel whereby a secondary flow of gas passes upwardly through the reactive mass thereby cooling the reactor and removing fission products from the reactive mass and then gives up its heat in the heat exchanger.

2. The combination according to claim 1 wherein the material fissionable by neutrons of thermal energy is $U^{235}$ employed in the form of $U^{235}O_2$ and the moderator is beryllium oxide.

3. The combination according to claim 2 wherein the pebbles are about two inches in diameter, and the reactive mass includes about 63 kilograms of $U^{235}$ and about 3500 kilograms of beryllium oxide.

(References on following page)

References Cited in the file of this patent

UNITED STATES PATENTS

| | | |
|---|---|---|
| 667,744 | Stolze | Feb. 12, 1901 |
| 2,298,625 | Larrecq | Oct. 13, 1942 |
| 2,421,387 | Lysholm | June 3, 1947 |
| 2,708,656 | Fermi et al. | May 17, 1955 |

FOREIGN PATENTS

| | | |
|---|---|---|
| 125,433 | Great Britain | Apr. 24, 1919 |
| 114,150 | Australia | May 2, 1940 |
| 861,390 | France | Oct. 28, 1940 |
| 233,011 | Switzerland | Oct. 2, 1944 |

OTHER REFERENCES

Business Week, pages 58–64, September 1, 1945. Copy in Patent Office Library (204/154.2).

Goodman: "The Science and Engineering of Nuclear Power," volume 1, page 371, Addison-Wesley (1947). Copy in Patent Office Library.

Kelly et al.: Physical Review 73, 1135–9 (1948). Copy in Patent Office Library.

H. D. Smyth: A General Account of the Development of Methods of Using Atomic Energy for Military Purposes, 1940–1945. August 1945, pages 22, 177. Copy available from Supt. of Documents, Washington, D.C.

Harwell: The British Atomic Energy Research Establishment 1946–1951. London, 1952. Her Majesty's Stationery Office. Pages 39, 40, 41. Copy in Division 70.

United States Atomic Energy Commission MDDC–893. Factors Involved in the Production of Atomic Power, by Farrington Daniels. Declassified April 7, 1947. Pages 3–11. Available from AEC, Oak Ridge, Tenn.